(12) United States Patent
Neale et al.

(10) Patent No.: US 6,265,040 B1
(45) Date of Patent: *Jul. 24, 2001

(54) SELF-BONDING SYNTACTIC FOAM INSULATED CONTAINER SLEEVE

(75) Inventors: Douglas L. Neale, Loudon, TN (US); Richard J. Pasin, Wilmington, NC (US)

(73) Assignee: Insulation Dimension Corporation, Leland, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/437,192

(22) Filed: Nov. 9, 1999

Related U.S. Application Data

(63) Continuation-in-part of application No. 09/256,912, filed on Feb. 24, 1999, which is a continuation of application No. 09/661,332, filed on Jun. 14, 1996, now Pat. No. 5,952,068.

(51) Int. Cl.[7] ........................................................ B32B 5/18
(52) U.S. Cl. .................... 428/36.5; 428/35.7; 428/34.2; 428/206; 428/220; 428/313.5; 428/339; 428/349; 428/542.8; 229/403; 22/592.22; 22/592.25; 22/903
(58) Field of Search ................................. 428/36.5, 36.4, 428/35.7, 34.2, 192, 195, 206, 220, 312.2, 313.5, 332, 339, 343, 349, 542.8; 229/403, 406; 220/62.12, 592.2, 592.22, 592.25, 903

(56) References Cited

U.S. PATENT DOCUMENTS

| | | | |
|---|---|---|---|
| 3,468,467 | * | 9/1969 | Amberg ............................... 229/403 |
| 4,237,171 | * | 12/1980 | Laage et al. ......................... 428/34.2 |
| 5,145,107 | * | 9/1992 | Silver et al. ......................... 229/403 |
| 5,226,585 | * | 7/1993 | Varano ................................. 229/400 |
| 5,363,982 | * | 11/1994 | Sadlier .............................. 229/103.11 |
| 5,490,631 | * | 2/1996 | Iioka et al. .......................... 229/403 |
| 5,705,242 | * | 1/1998 | Andersen et al. .................. 428/36.4 |
| 5,766,709 | * | 6/1998 | Geddes et al. ...................... 428/35.7 |
| 5,952,068 | * | 9/1999 | Neale et al. ........................ 428/36.5 |

* cited by examiner

Primary Examiner—Rena L. Dye
(74) Attorney, Agent, or Firm—Gibbons, Del Deo, Dolan, Griffinger & Vecchione

(57) ABSTRACT

A thermally insulated sleeve is adapted to fit over a cup. The sleeve has a sidewall having an inside surface and an outer surface. The sidewall is adapted to seal the sidewall upon itself and to form a seam. A thin thermally insulating coating having a controlled thickness is supported by the sidewall. The thin thermally insulating coating is comprised of a binder and void containing particles, ranging from 0.1 microns to 200 microns in size, adapted to being restricted by the binder. A heat-activated adhesive is supported by the inside surface of the sidewall. When the sleeve is heated the heat activated adhesive bonds the sleeve to the cup.

20 Claims, 3 Drawing Sheets

SELF-BONDING SYNTACTIC FOAM INSULATED CONTAINER SLEEVE

CROSS REFERENCE TO RELATED APPLICATION

This application is a Continuation-In-Part of co-pending U.S. patent application Ser. No. 09/256,912, still pending, entitled Syntactic Foam Insulated Container, Filed on Feb. 24, 1999, which is a continuation of U.S. patent application Ser. No. 09/661,332, filed Jun. 14, 1996, U.S. Patent No. 5,952,068 entitled Syntactic Foam Insulated Container, issued on Sep. 14, 1999, having common inventors and assignees and being incorporated herein by reference.

FIELD OF THE INVENTION

This invention relates to containers, and more particularly to an insulating sleeve for a container.

BACKGROUND OF THE INVENTION

The production and use of disposable containers, such as cups, is well known with production measured in the billions of units annually. Because of this volume, the business is fiercely competitive and cost is measured in units of one thousand. A change of a few percent in cost can make a container unsaleable, particularly to large fast food chains.

Paper and paperboard are widely used as materials in the production of disposable containers because they are inexpensive and amenable to very high volume production. They have limitations, however, particularly in containing hot liquids, such as coffee, tea, hot chocolate, etc., which are dispensed from vending machines or supplied in fast food or takeout restaurants. The initial temperature of coffee poured into a disposable cup can exceed 200 degrees Fahrenheit, resulting in the temperature on the outside of the disposable which is painful to hold. A typical reaction to this thermal pain can cause spillage, resulting in severe damage to the skin, and inevitable product liability litigation.

Thick walled insulated cups are bulky, taking up extensive volume in storage and disposal. The use of a thick walled insulated cup for cool beverages is not cost effective.

Accordingly, there still exists a need for an inexpensive container sleeve which provides a controlled amount of heat transfer to warn the user that a hot liquid is contained therein, which insulates sufficiently to protect against pain or burn, which is stackable for shipping and mass sales, and which is microwave compatible.

SUMMARY OF THE INVENTION

The present invention is a thermally insulated sleeve adapted to fit over a cup. The sleeve has a sidewall having an inside surface and an outer surface. The sidewall is adapted to seal the sidewall upon itself and to form a seam. A thin thermally insulating coating having a controlled thickness is supported by the sidewall. The thin thermally insulating coating is comprised of a binder and void containing particles, ranging from 0.1 microns to 200 microns in size, adapted to being restricted by the binder. A heat-activated adhesive is supported by the inside surface of the sidewall. When the sleeve is heated the heat activated adhesive bonds the sleeve to the cup.

DESCRIPTION OF THE DRAWINGS

The present invention is described in detail below in conjunction with the drawings, which are not to scale, of which.

DETAILED DESCRIPTION OF VARIOUS ILLUSTRATIVE EMBODIMENTS

Figure 1A:
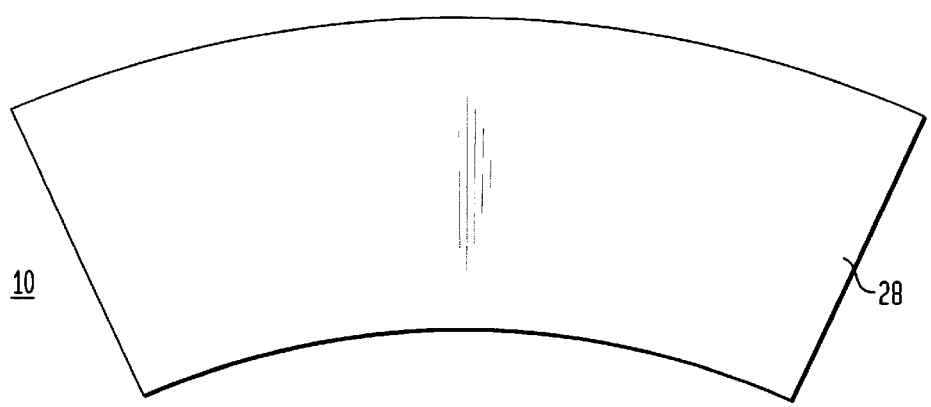
FIGS. 1A–1D show a thermally insulated sleeve in an additional embodiment.

Although the present invention, a self-bonding syntactic foam insulated container sleeve, is particularly well suited for use with cylindrical or conical containers, and well is so described, it is equally well suited for use with containers having other geometrical configurations, including rectangular, trapezoidal prisms, etc.

The use of disposable containers reaches billions of units per year in the home and in the fast food industry. These containers are often in the form of drinking cups, which are made from paper, paperboard, or plastic, and to be competitive in the marketplace they must be very inexpensive. Paper or paperboard is an inexpensive material, and it is also well adapted to high volume production. To produce a container, paper stock is coated on one side with a thin layer of polyethylene which makes the cup impervious to moisture and which also seals the seam of the cup after the blank is die cut from the paper stock and formed around a similarly coated base to form a cup. However, paper or paperboard is not a sufficient thermal insulator when used for the sidewalls of a cup which stores hot liquids. For example, coffee can be made and dispensed temperatures near 200 degrees Fahrenheit. A common experience is lifting a paper cup from a coffee dispensing machine and burning the fingers on the sidewall of the cup.

A variety of configurations have been proposed to improve the insulation properties of the sidewall of paper containers by using double walled sidewalls which trap air and reduce heat transfer. These approaches can add a factor of three times the material cost or complicate the forming and sealing operation.

The present invention uses a single layer wall with an added layer of insulation, on the external side of the sidewall. Although this embodiment describes the insulation on the external side (outside) of the sidewall, the present invention is equally well suited for application of the insulation on the internal side (inside) of the sidewall. The layer may be applied on the sidewall in a single coat, or in multiple coats, in a continuous pattern or in a matrix pattern of lines, dots, or any other fanciful pattern. High volume printing, in moderately thick layers as used in the present invention, is well known in the graphic arts industry.

The present invention relates to any insulated container for hot or cold products and liquids. To be responsive to the needs referenced above, the container needs to be inexpensive, so a layer of insulation is applied to one side of a blank used to make it. The blank is typically paper or paperboard to control cost, but the insulation could be applied to a single-walled plastic cup as well. The insulation is a syntactic foam, that is, a foam which incorporates insulating particles which are held in place by a binder. Greater insulation is obtained where the insulating particles are void containing particles which can be made from thermoplastic, thermoses, or inorganic materials which enclose an air space. The void containing particles may be of arbitrary shape and they may be applied to the blank in expanded or unexpanded form. A subsequent heating operation may be used to expand previously unexpanded particles so that they contain voids. There are many different types of void containing particles and they may be used alone or in combination with each other to achieve a particular degree of insulation or other mechanical properties. These void containing particles are held in place by a binder, into which other ingredients may also be added to produce a color (pigment), to control viscosity (thickeners and solvents), and to control density (fillers and foaming agents).

The syntactic foam avoids the need for double-walled construction with spacers, which construction uses as much as three times the paper stock. The foam also provides a controlled degree of insulation by adjusting its thickness, particle type, and composition, so that a user has enough sensation to know that a hot or cold liquid is inside the cup, yet not enough sensation to cause discomfort.

The container may be cone shaped so it is nestable as are most paper cups, and the materials of its construction may be inserted into a microwave oven without damage.

The insulating layer may be applied in various configurations. In one embodiment of the invention the foam is applied in a continuous layer on the outside of the cup's sidewall, nearly covering the blank from which the cup is made except for edge areas which are designated for sealing the sidewall to itself and the bottom of the cup and the formation of the rolled rim at the top of the cup. The outer insulating coating may be applied as a pattern of matrix elements, which may be dots, lines, quadrangles, arcs, letters, symbols, or any other fanciful configuration.

The interrupted pattern saves material, yet still keeps fingers away from the sidewall because of air spaces between the pattern elements are limited so that fingers can not descend between the elements to touch the sidewall.

In an additional embodiment a syntactic foam is supported by a substrate which may be plastic, paper, or paperboard, the substrate being adapted to be formed into a frustra-cone which may be placed over a conventional cup as a sleeve. The foam may be in any number of layers and compositions as described in all the previous embodiments.

The sleeve may be attached to a conventional cup or container by any adhesive or sealing method well known in the art. This embodiment has the advantage of providing thermal insulation to the vast inventory of conventional cups or containers. Multi-layer applications may be contemplated for some of the embodiments, and a combination foam employing void containing particles together with a foaming agent may produce a spongy coating incorporating the void containing particles. Expanded or unexpanded void containing particles may be applied singly or in combination.

The addition of microspheres improves the mechanical properties by reducing density, lowering volume costs, improving impact resistance, and reducing shrinkage. The reaction injection molding process has become important in the production of external automotive body parts.

The present invention incorporates graphic arts application processes and the use of microspheres in syntactic foams to control thermal properties, rather than the mechanical properties described above.

When an insulated sleeve is placed on a disposable container, it may slip or move. Pressure sensitive adhesives comprise materials, which are normally in an adhesive or tacky state at room or ambient temperatures and hence require no heating for activation. Normally, to prevent unwarranted or premature adhesion between pressure sensitive adhesives and other surfaces with which the adhesive might contact, a removable covering material is provided. As it is necessary for the insulated sleeve to slide into place, a pressure sensitive adhesive is not suitable for attaching an assembled sleeve to a disposable container.

Figure 1B:
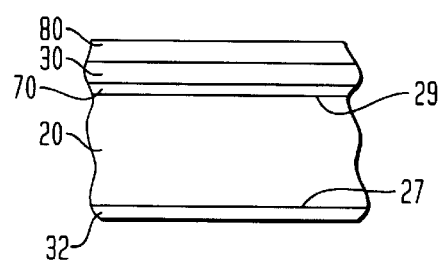
Figure 1C:
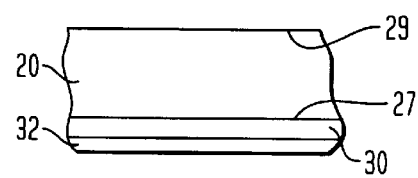
Figure 1D:
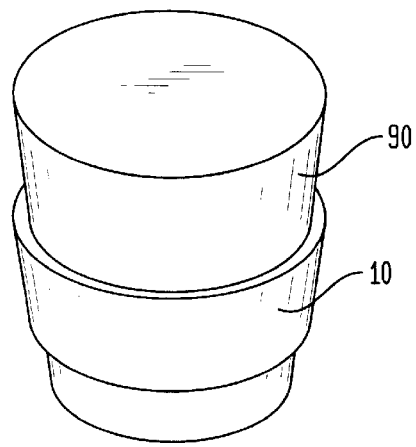

Referring now to FIG. 1A, there is shown an embodiment of the present invention wherein the insulating sleeve 10 is comprised of blank 28 upon which various layers may be deposited. FIG. 1B shows a cross section of these layers wherein a heat-activated adhesive 32 is applied to inside surface 27 of sidewall 20. An optional tie coat 70 may be interspersed between thermally insulating outer coating 30 and outer surface 29 of sidewall 20 to promote adhesion between them. A second thermally insulating layer 80 may be applied over outer coating 30 to provide additional insulation. FIG. 1 shows a cross section of another embodiment wherein the heat-activated adhesive 32 is applied to over the thermally insulating coating 30 which is applied to the inside surface 27 of sidewall 20. FIG. 1D depicts insulating sleeve 10 formed into a conical shape, open at both ends, so it is adapted to mate with a conical cup 90. The advantage of this embodiment is that it provides thermal insulation to the vast existing inventory of conventional cups or containers.

When the inside surface 27 of the insulating sleeve supports the heat-activated adhesive 32, the insulating sleeve 10 will not slip off of a hot beverage cup during use. The heat-activated adhesive 32 can be applied by printing such as by gravure, flexographic or rotary screen equipment. The heat-activated adhesive 32 is printed on the inside surface 27 of the insulating sleeve 10, either directly onto the paperboard or onto the insulating foam, which was previously applied.

The heat-activated adhesive 32 has the unique ability to become tacky when heated by the elevated temperature of the hot beverage cup. The heat-activated adhesive 32 forms a bond with the hot beverage cup, even though the heat-activated adhesive 32 is still soft and pliable as a result of the residual heat from the beverage cup. Upon cooling, the adhesive bond is retained. Thus the repeated filling and emptying of the beverage cup with a hot liquid, or even alternately with a cold liquid, does not adversely effect the adhesive bond.

When the heat-activated adhesive 32 is applied directly to the paperboard of the inside surface of the sleeves, the application can be in a large pattern, such as large circles, etc, or up to substantially 100% coverage. The actual coverage required is only that which is necessary to provide for sufficient bonding of the sleeve to the beverage container. When the insulating syntactic foam is on the inside surface and the adhesive is applied over the insulating syntactic foam, it is advantageous to sufficiently cover the insulating syntactic foam with the heat activated adhesive in order to reduce the insulating syntactic foam from sticking to itself. Thus making it easier to distribute the sleeves in a flattened form.

Heat-activated adhesives comprise materials adapted when heated to an activation temperature to become adhesive or tacky. On cooling after heating, they revert to a non-tacky state, and if in contact with another surface prior to and during the cooling cycle, an adhesive bond will be achieved when cooling is completed. Heat activated adhesives may be either low or high tack types. A low tack adhesive comprises an adhesive material which when heated becomes fairly molten or fluid thereby providing a high degree of surface wet-out with minimum application pressure or heat. A high tack adhesive comprises an adhesive material which when heated remains highly viscous and somewhat immobile so that a definite amount of application pressure and/or heat is necessary to wet-out the surface being adhered. The heat-activated adhesive should be a high tack, low foam material, suitable for high-speed coating, having an activation temperature essentially above 150° F. and below 200° F.

Figure 2A:
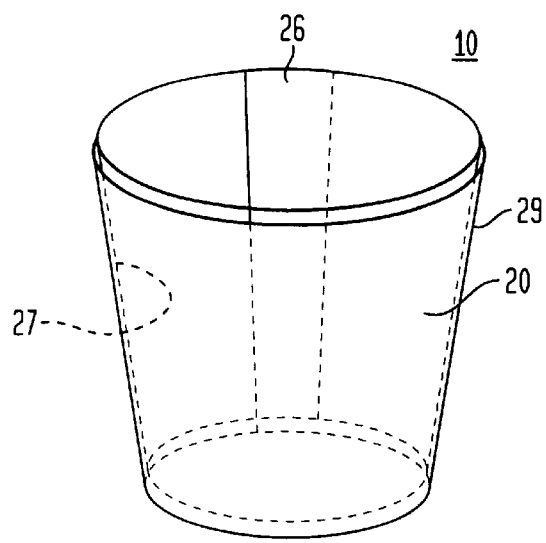
FIG. 2A shows a typical container.

Referring now to FIG. 2A, there is shown insulated sleeve IO where the sidewall is formed in the form of a frustra-cone which is open at the top and bottom. The sidewall has an outer surface 29 and an inside surface 27 and it is rolled from blank 28 which is cut from stock, typically plastic, paper or paperboard, and preferably solid bleached sulfate ranging in thickness from 10 mils to 26 mils. This method of construction is given by way of example because the method of construction may vary with the type of sleeve. The outer surface 29 of sidewall 20 supports thermally insulating outer coating 30, which may not cover the entirety of the blank, but which can leave a frame 31 uncoated so that the inside can seal the sidewall at seam 26. Machines, which seal the sidewall to form a seam, are well known and are adapted to high volume production. The seam can be formed using adhesives, which may range from heat seals, hot melts, pressure sensitive, and cold set types, which are well known in the art of making containers. Not all seams are formed by use of adhesives; being locked together forms some seams.

Figure 2B:
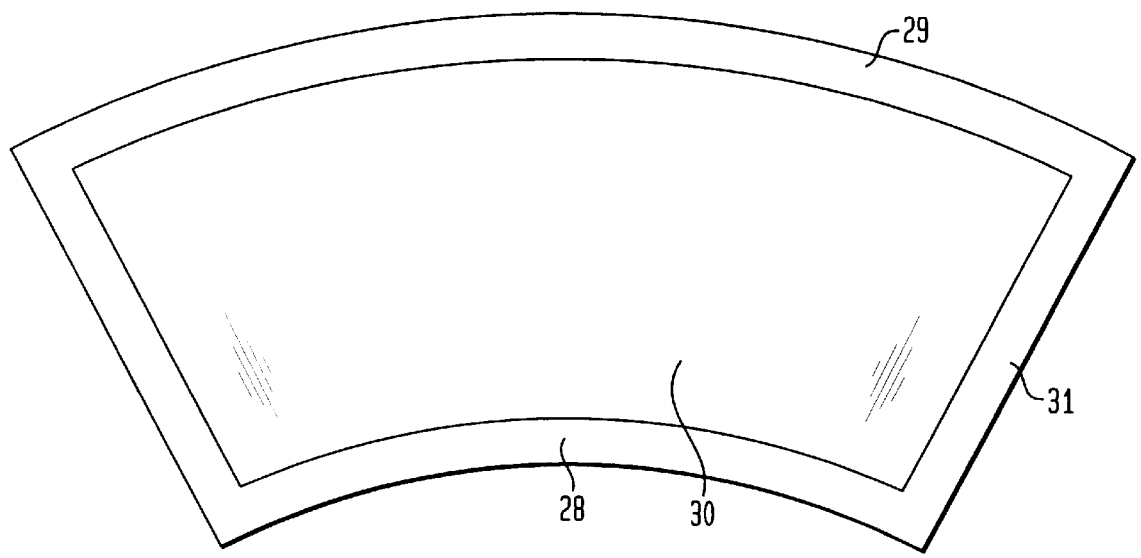
FIG. 2B shows a blank from which the typical container is produced.
Figure 2C:
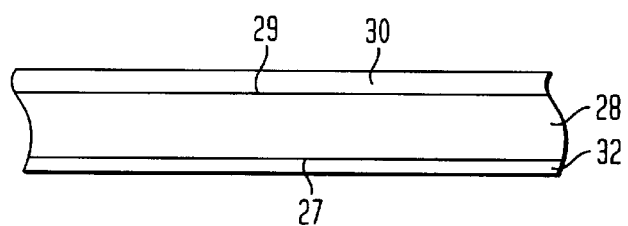
FIG. 2C shows a cross sections of the sidewall of the blank.

In one embodiment of the invention, thermally insulating outer coating 30 is continuous over a major part of the sidewall (excluding the area of the frame 31) as shown in FIG. 2B. A cross section of the various layers is shown in FIG. 2C. Of course, multiple layers could be added to this structure to promote adhesion, increase thermal insulation, or to enhance appearance.

Any process such as spraying, air knife, or withdrawing a substrate from a bath may apply the thermally insulating coating. These are all well known in the art of coating. In addition, any printing process may apply the thermally insulating coating, such as: offset, gravure, flexographic, rotary screen, wire rod, air knife, spray, or others. Preferably the printing is done through a rotary metal screen. Rotary screen printing is well adapted to high volume production. A thermally insulating coating of 10 to 30 mils in thickness may be achieved in a single pass. And thicker coatings are possible with multiple applications. The function of the thermally insulating outer coating is to provide a controlled amount of insulation so that the user can hold the container comfortably, yet know that a hot or cold food or liquid is contained inside. By controlling the composition and thickness of the thermally insulating outer coating, thermal protection to the user is achieved while minimizing the material cost of the container. The thermally insulating outer coating contains void containing particles which can be made from thermoplastic, thermoses, or inorganic materials. A void containing particle comprises an outer shell of arbitrary shape which surrounds any medium of lower thermal conductivity or lower density. The void containing particle may be in expanded or unexpanded form. An unexpanded void containing particle will expand with the application of heat which expands the encapsulated medium and also softens the surrounding outer shell until the pressure of the medium is balanced by restraining forces in the outer shell. The void containing particles may range from 0.1 microns to 200 microns in size in either form. Typical examples of the materials of the outer shell would be polyvinylidene copolymers or glass. The largest size in the application process being limited by the openings in the metal mesh of the printing machine. If unexpanded microspheres are applied to the blank, a subsequent heating process may be employed to expand them. This might be coupled with the sealing operation. Experiments have also shown that multiple applications of unexpanded microspheres, separated by an expansion step provide better insulation than a single application of the same thickness. The binder holding the microspheres may be any suitable synthetic or natural binder including aqueous based, solvent based, high solids, or 100% solids materials, such as radiation cured systems, which are mentioned in the references. Additional ingredients may be added to the formulation, such as: pigments or dyes for coloring, fillers/extenders or organic or inorganic materials, and surfactants for dispersion or rheology, thickeners and solvents to control viscosity for optimized application, foaming agents to control the density of the coating, additives like waxes or slip aids, plasticizers and other ingredients common and well known to the art of formulation of coatings. Among many possible inorganic fillers, typical ones which may be selected include clay, silica, or a variety of calcium carbonates. In a preferred embodiment, the resin is acrylic, the void containing particles are synthetic microspheres whose particle size distribution ranges from 10 to 20 microns, and whose weight fraction in the wet mix ranges from 1 to 20 percent. The microspheres are available from a variety of commercial sources. Other additions may include: inorganic silica beads which are available as "Sil-cell" brand from Silbrico Corporation, Hodgkins, Ill., or coated microspheres which are available as "Dualite" brand from Pierce and Stevens, a division of Pratt and Lambert, Buffalo, N.Y.

Figure 3:
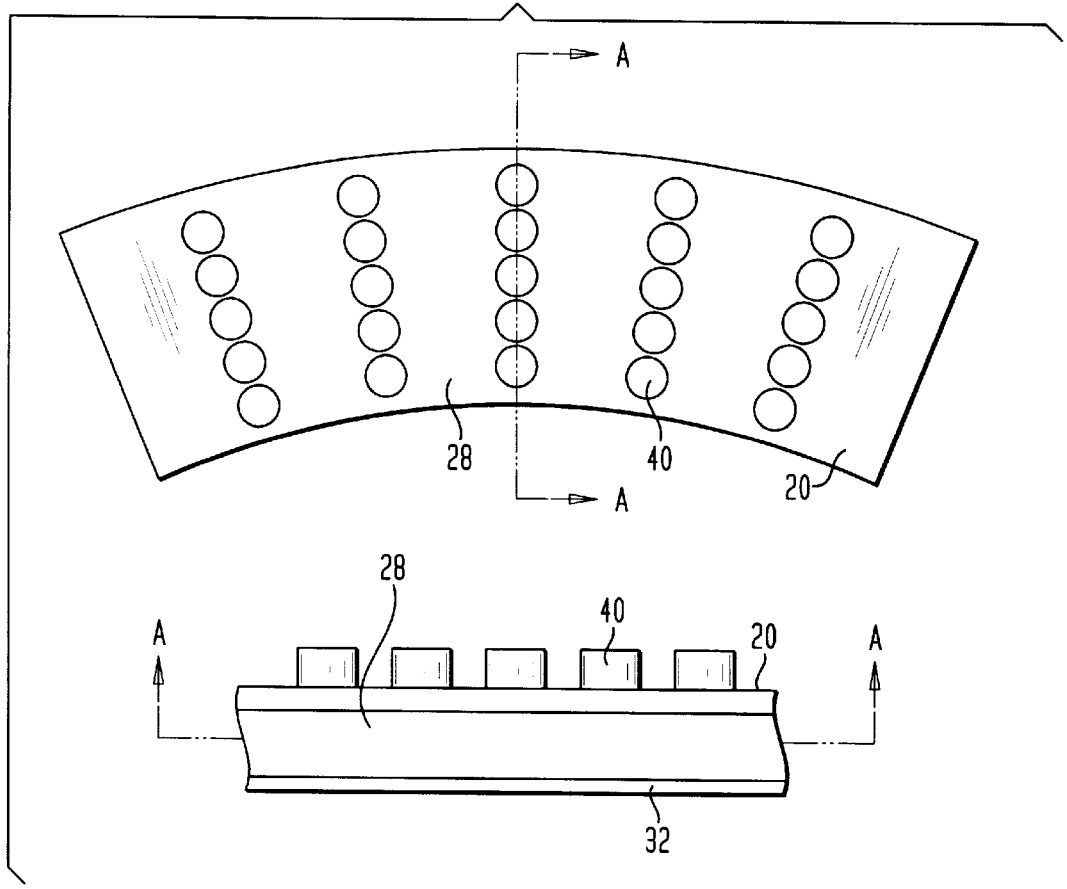
FIG. 3 shows a blank of another embodiment.

Referring now to FIG. 3, there is shown blank 28 supporting a pattern comprising a matrix of elements such as dots, but it can be any interrupted pattern of elements such as: dots, lines, quadrangles, arcs, alphabetical letters, symbols, or any other fanciful configuration. The common properties among them being that (1) the interrupted pattern saves material, and (2) the pattern elements are sufficiently close together to prevent fingers from descending between the pattern elements to touch the sidewall. The insulation properties of the pattern are therefore controlled by the thickness and composition of the material comprising pattern 40, together with the ratio of the area of the elements of pattern 40 to the area of the sidewall beneath a user's fingers. Area ratios may range from 1 to 100 per cent. The lower end of the coverage ratio being controlled by the maximum distance between pattern elements which will support a finger away from sidewall 20.

Figure 4:
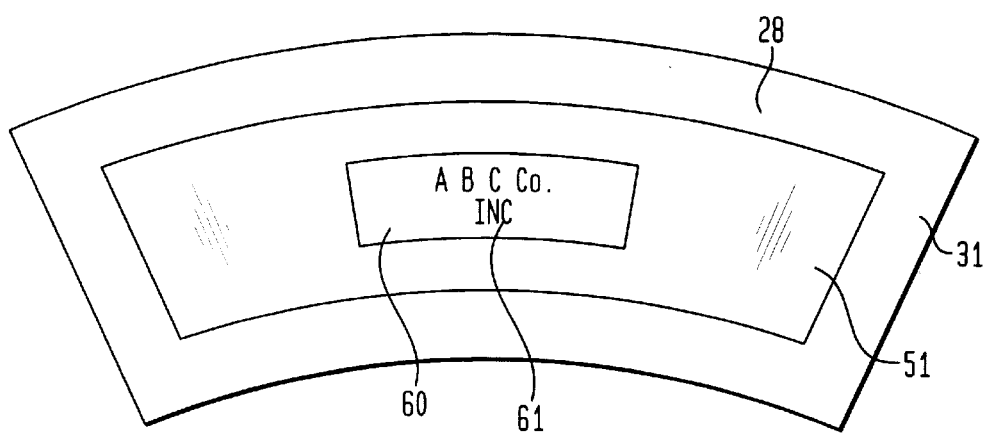
FIG. 4 shows a blank of yet a further embodiment.

Referring now to FIG. 4, there is shown yet a further embodiment of the present invention wherein blank 28 supports outer coating 51 within frame area 31. Outer coating 51 defines a label area 60 within which graphic information 61 may be printed which identifies or advertises the maker of the cup, the purveyor of its contents, or any other information. Outer coating 51 may be a continues coating, or it may be-comprised of a matrix of pattern elements.

Numerous modifications and alternative embodiments of the invention will be apparent of those skilled in the art in view of the foregoing description. In particular, in any of the embodiments above, multi-layers comprised of unexpanded void containing particles, previously expanded void containing particles, or both, are also within the scope of the invention. The resulting thickness could reach 120 mils or more. A coating containing void containing particles plus a foaming agent could provide a spongy coating. Various combinations of under-layer and patterns are also within the scope of the invention. Extensive colorization of the insulating layer can provide a dynamic dramatic presentation. An a heat sensitive material can be used to indicate the container temperature by color or contrast. When this indication is of the un-insulated material, the indication will provide an approximate temperature of the contents of the container. Accordingly, this description is to be construed as illustrative only and is for the purpose of teaching those skilled in the art the best mode of caring out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claim is reserved.

We claim:

1. A thermally insulated sleeve adapted to fit over a cup, the sleeve comprising;
    a sidewall having an inside surface and an outer surface, wherein the sidewall is adapted to seal the sidewall upon itself and to form a seam;
    a thin thermally insulating coating having a controlled thickness, supported by the sidewall, comprising a binder and void containing particles, ranging from 0.1 microns to 200 microns in size, adapted to being restricted by the binder; and
    a heat activated adhesive supported by the inside surface of the sidewall for bonding the sleeve to the cup.

2. The thermally insulated sleeve as recited in claim 1 wherein the thin thermally insulating coating is supported by the inside surface of the sidewall.

3. The thermally insulated sleeve as recited in claim 1 wherein the thin thermally insulating coating is supported by the outer surface of the sidewall.

4. The thermally insulated sleeve as recited in claim 2 wherein said heat activated adhesive covers further substantially all of the thin thermally insulating coating.

5. The thermally insulated sleeve as recited in claim 1 further comprising a thin thermally insulating layer having a controlled thickness supported by the thin thermally insulating coating.

6. The thermally insulated sleeve as recited in claim 1 wherein the thin thermally insulating coating comprises an interrupted pattern of closely spaced elements.

7. The thermally insulated sleeve as recited in claim 1 wherein the heat activated adhesive is activated above 150° F.

8. The thermally insulated sleeve as recited in claim 1 wherein the heat activated adhesive is activated below 200° F.

9. The thermally insulated sleeve as recited in claim 1 wherein the heat activated adhesive is tacky when activated.

10. The thermally insulated sleeve as recited in claim 2 further comprising a thin thermally insulating layer having a controlled thickness which is supported by the outer surface of the sidewall.

11. A blank adapted to the manufacture of a thermally insulated sleeve which is adapted to fit over a cup having a conical shape, the blank comprising;
    a sidewall having an inside surface and an outer surface, wherein the sidewall is adapted to seal the sidewall upon itself and to form a seam;
    a thin thermally insulating coating having a controlled thickness, supported by the sidewall, comprising a binder and void containing particles, ranging from 0.1 microns to 200 microns in size, adapted to being restricted by the binder; and
    a heat activated adhesive supported by the inside surface of the sidewall for bonding the sleeve to the cup.

12. The blank as recited in claim 11 wherein the thin thermally insulating coating is supported by the inside surface of the sidewall.

13. The blank as recited in claim 11 wherein the thin thermally insulating coating is supported by the outer surface of the sidewall.

14. The blank as recited in claim 12 wherein said heat activated adhesive covers further substantially all of the thin thermally insulating coating.

15. The blank as recited in claim 11 further comprising a thin thermally insulating layer having a controlled thickness supported by the thin thermally insulating coating.

16. The blank as recited in claim 11 wherein the thin thermally insulating coating comprises an interrupted pattern of closely spaced elements.

17. The blank as recited in claim 11 wherein the heat activated adhesive is activated above 150° F.

18. The blank as recited in claim 11 wherein the heat activated adhesive is activated below 200° F.

19. The blank as recited in claim 11 wherein the heat activated adhesive is tacky when activated.

20. The blank as recited in claim 12 further comprising a thin thermally insulating layer having a controlled thickness which is supported by the outer surface of the sidewall.

* * * * *